United States Patent [19]

Nelson

[11] 4,373,603
[45] Feb. 15, 1983

[54] AUTOMATIC CRAB STEERING

[75] Inventor: Carl D. Nelson, Litchfield Park, Ariz.

[73] Assignee: J. I. Case Company, Racine, Wis.

[21] Appl. No.: 240,698

[22] Filed: Mar. 5, 1981

[51] Int. Cl.³ .......................... B60D 1/14; B62D 9/02
[52] U.S. Cl. ........................................ 180/236; 172/3; 172/7; 180/140; 180/141; 280/446 A
[58] Field of Search .................. 180/236, 140, 141; 280/446 A, 446 R; 172/2, 3, 7, 9, 10

[56] References Cited

U.S. PATENT DOCUMENTS 3,516,498 6/1970 Schowalter .............................. 172/9
3,903,983 9/1975 Yeske ...................................... 180/140
4,175,638 11/1979 Christensen ............................ 180/140

Primary Examiner—Joseph F. Peters, Jr.
Assistant Examiner—Donn McGiehan
Attorney, Agent, or Firm—Cullen, Sloman, Cantor, Grauer, Scott & Rutherford

[57] ABSTRACT

A steering control system for automatically positioning the drive wheels of a tractor for crab steering in response to implement side draft. The steering system includes a conventional control device that produces output signals that are a function of the angular positions of the front and rear tractor wheels. The control device has a movable selector switch associated therewith which conditions the steering system for various modes of operation including automatic crab steering. In this mode of operation, a control signal from the implement draft arms is integrated into the conventional steering system control device for operating or turning the drive wheels to a crab position thereby counteracting implement side draft. Sensors are provided for detecting any changes in side draft force applied by the implement to the tractor draft arms. A variance in the control signal from the draft arm sensors in response to implement side draft is translated to the control device for the steering system for causing actuation of an appropriate control valve and operation of hydraulic motors to turn the tractor drive wheels to a crab position.

4 Claims, 4 Drawing Figures

AUTOMATIC CRAB STEERING

BACKGROUND OF THE INVENTION

The present invention relates to a steering system for agricultural tractors and more particularly to a steering control system which automatically positions the tractor drive wheels for crab steering in response to implement side draft.

For many years, most agricultural tractors were controlled through the use of a steering wheel that controlled the turning movement for the front pair of wheels. Because of the substantially increased size of agricultural tractors in recent years, other steering systems have been developed that are more versatile than conventional front wheel steering. For example, four wheel steering systems have been developed wherein the respective wheels can be individually controlled to have various modes of steering control for the tractor.

One such steering system utilized by the assignee of the present invention provides for several modes of steering operation for the tractor. The first mode is referred to as front wheel steering where the rear wheels are locked in a set position with respect to the frame of the tractor and the front wheels are steerable. The second mode of steering is referred to as four wheel steering where the front and rear wheels are turned an equal amount but in opposite directions providing coordinated steering for sharp turns. A third mode of steering is commonly referred to as crab steering where the front and rear wheels are angularly disposed with respect to the longitudinal axis of the tractor at equal angles in the same direction so that the longitudinal axis of the tractor is moved in a generally sidewise direction. An additional mode of steering allows for independent control of the rear wheels when the tractor is being operated in a crowded area or when the tractor is being moved towards an implement for hook up.

U.S. Pat. Nos. 3,903,983 and 4,175,638, assigned to the assignee of the present invention, are illustrative of coordinated steering systems wherein the front and rear wheels can be independently controlled and the rear wheels positioned as a function of the angular position of the front wheels. While these systems have been found to be commercially acceptable for controlling the turning movement of an agricultural tractor having four driven wheels, there is a need for even more versatile systems which can be incorporated into the basic structure of the tractor without extensive modification thereof.

Crab steering is a mode of steering operation which could be improved in presently known systems. As described, crab steering permits the tractor and attached implement to move laterally or sideways for going around a wet spot in a field, closing up an overlap in the field, working closer to fence rows and the like. When working on hillsides, crab steering permits the wheels to be turned up slope to offset any implement side draft or jackknifing which reduces the possibility of the tractor sliding down the hill. A problem with known systems is that the operator may not be able to react quickly enough to counteract the undesirable tractor sliding because he must perform certain manual procedures before the crab steering mode can be actuated. Thus, there has been a need for a more versatile steering control system which will automatically position the tractor drive wheels for crab steering in response to implement side draft.

SUMMARY OF THE INVENTION

According to the present invention, a steering system has been developed which automatically positions the tractor drive wheels for crab steering in response to implement side draft. The steering system includes an electrical control means such as that disclosed in U.S. Pat. No. 4,175,638, assigned to the assignee of the present invention, that senses the angular position of the front and rear wheels and produces output signals that are a function of these positions. The control means has a switch means associated therewith which is capable of conditioning the steering system for various modes of operation such as coordinated or radiarc steering, front wheel steering only, and independent rear wheel steering. As part of the present invention, the switch means also incorporates an automatic crab steering position which integrates into the control means a control signal from the attached implement for turning the driving wheels to a crab position for counteracting implement side draft.

As is conventional, the tractor front wheels can be steered or turned through the use of a conventional steering system while the rear wheels can be positioned in response to the turning movement of the front wheels. The selection of the mode of steering is accomplished through a movable selector means that moves the switch means through a plurality of positions corresponding to the various modes of operation, one of which is automatic crab steering. In this mode of operation, the movable selector means is in a position that permits a control signal from the implement draft arms to be integrated into the conventional steering system control means for operating or turning the drive wheels to a crab position thereby counteracting implement side draft.

The present invention provides a simple and efficient control mechanism for actuating a control valve operating hydraulic motors which turn the tractor driving wheels in response to implement side draft. An implement is conventionally attached to the free ends of the tractor draft arms and produces a draft load upon the arms which is determined by the type of implement as well as the depth of the implement in the ground. Sensing means are provided for detecting any changes in side draft force applied by the implement to the draft arms. In the illustrated embodiment, the draft sensing means are in the form of conventional variable inductance transducers or load cells.

A variance in the signal through the draft arm load cells in response to implement side draft is translated to the control means of the steering system for causing actuation of the control valve and operation of the hydraulic motors to turn the tractor drive wheels to a crab position. A sensitivity control is provided between the load cells and steering system control means to prevent unnecessary and undesirable movement of the drive wheels until the current imbalance in the load cells reaches a predetermined level.

The steering system is normally placed in the automatic crab steering mode of operation when the tractor and attached implement are working on a hillside. In this environment, it is desirable that the drive wheels be turned up slope immediately when any implement side draft or jackknifing occurs to reduce the possibility of the tractor sliding down the hill. In order to avoid time consuming, conventional, manual procedures for setting crab steering, the operator positions the movable selector means and switch means associated therewith to the automatic crab steering setting. Then, the control signal from the draft arm load cells is transmitted to the control means for the steering circuit.

An unequal side load applied to the draft arms creates an unbalanced current flow from the load cells through the sensitivity control to the steering system control means. If the load imbalance is sufficient to overcome the sensitivity control setting, the steering system control means actuates the control valve that operates the hydraulic motors associated with the drive wheels to turn the drive wheels to an appropriate crab position depending upon the direction of load imbalance. The crab steering compensation will continue until the draft load on the draft arms becomes equal within the sensitivity control setting. The automatic crab steering position may be switched off at any time which permits the drive wheels to be controlled in a conventional manner.

Other advantages and meritorious features of the automatic crab steering system of the present invention will be more fully understood from the following description of the preferred embodiment, the appended claims and the drawings, a brief description of which follows.

DETAILED DESCRIPTION OF THE INVENTION

Figure 1:
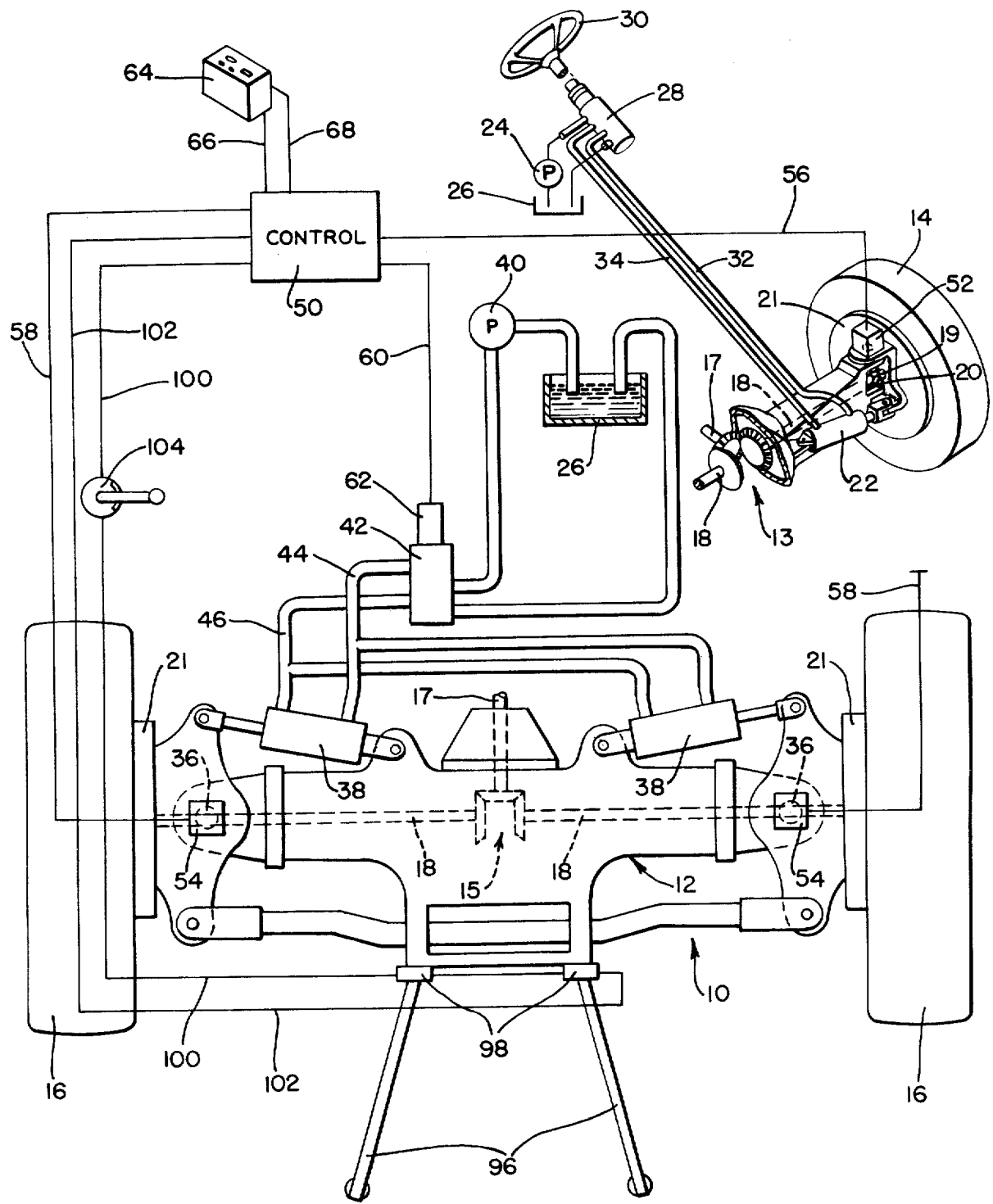
FIG. 1 schematically illustrates selected portions of an agricultural tractor having the automatic crab steering system of the present invention incorporated therein.

While this invention is susceptible of embodiment in many different forms, there is shown in the drawings and will herein be described in detail, a preferred embodiment of the invention with the understanding that the disclosure is to be considered as an exemplification of the principles of the invention and is not intended to limit the invention to the embodiment illustrated.

FIG. 1 of the drawings discloses a small portion of an agricultural tractor generally designated by the reference number 10, having a frame 12 illustrated. Tractor 10 has a front pair of wheels 14, only one being shown in FIG. 1, and a rear pair of wheels 16. As is conventional in four wheel drive tractors of the type manufactured by the assignee of the present invention, tractor 10 includes front and rear differentials 13 and 15 that are powered by a drive shaft 17 which is drivingly connected to an engine (not shown). Differentials 13 and 15 are drivingly connected to front and rear wheels 14 and 16, respectively, by means of drive shafts 18, universal joints 19, and conventional planetary gear units 21 at each of the wheels.

The front pair of wheels 14 are generally pivoted about vertical pivot axes 20 defined by king pins, through hydraulic motor means or fluid rams 22. Hydraulic fluid is supplied to motor means 22 through a pump 24 from a reservoir 26 and a power steering valve 28 which is controlled by a conventional steering wheel 30. Conduits 32 and 34 leading from steering valve 28 supply hydraulic fluid to one end of fluid ram 22 while connecting the opposite end to reservoir 26. While only one fluid ram 22 has been shown, it will be appreciated that a second fluid ram cooperates with the other front wheel, and the steering system provides means for controlling the turning movement of the front wheels.

Rear wheels 16 are also pivoted about vertical axes defined by king pins 36 through fluid rams 38. Pressurized fluid is supplied to fluid rams 38 from reservoir 26 through a pump 40, valve 42 and conduits 44 and 46.

The steering system includes a control means for coordinating the turning movements of the rear wheels in response to turning movements of the front wheels in a plurality of modes of operation. This control means is schematically illustrated as a control box 50 which cooperates with first and second sensing means 52 and 54 respectively associated with the front and rear wheels and connected to control box 50 through wires 56 and 58. The respective sensing devices 52 and 54 produce an output signal through wires 56 and 58 which is a function of the angular position of the respective wheels and, depending upon the selected mode of operation, control means 50 produces an output signal through a wire 60 to a solenoid 62 that cooperates with the rear steering valve 42.

The steering system, particularly control means 50, also has a selector or operator's control console 64 associated therewith which is capable of conditioning the control means 50 for operating the four wheels in a plurality of steering modes, one of which includes automatic crab steering as will be described. Selector means 64 has a first output signal 66 which conditions the control system 50 for the various modes of steering and a second output signal 68 which determines the annular position of the rear wheels when the control box 50 is in a rear steering control position. The control means 50, including some type of selector means 64, and signal producing means 68 for controling the rear wheels are disclosed in U.S. Pat. No. 4,175,638, which disclosure is incorporated by reference herein.

The operator's console 64 includes a rotatable selector means or control member 78 which cooperates with a switch 80 that is supported on a frame portion of the console 64. Selector means 78 is rotatable to move the actuator of switch 80 between a plurality of positions which correspond to a plurality of modes of controlling the turning movement of the rear wheels in response to turning movement of the front wheels.

Selector means 78 is moveable between a plurality of distinct positions, such as position 70 for four wheel radiarc steering, position 72 for front steering, position 74 for rear steering, and position 76 for automatic crab steering. The four wheel steering condition 70 has the rear wheels turning in the opposite direction to the front wheels at approximately the same amount so that the frame of the vehicle and the wheels move along a generally circumferential path. In the front wheel mode of operation 72, the rear wheels are locked in the straight ahead position and the steering is done in a conventional fashion. In the rear mode of operation 74, the rear wheels can be controlled independently of the front wheels and the front wheels can likewise be turned through the use of the conventional steering wheel.

Figure 4:
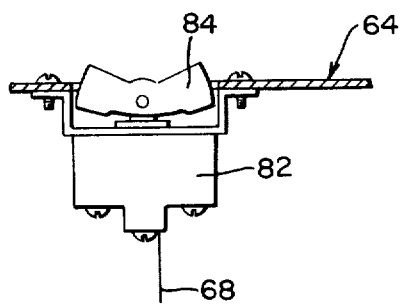
FIG. 4 is a sectional view taken along line 4-4 in FIG. 2.

Turning movement of the rear wheels is controlled by a signal producing means 82 which is in the form of a momentary contact rocker switch that is capable of varying a control signal through line 68 to control means 50 by appropriate actuation of an actuating member 84. Actuating member 84 is in the form of a rocker switch actuator which is normally biased to the position illustrated in FIG. 4 and is pivotable from the illustrated position in either direction indicated by "left" and "right" in FIG. 2. Thus, if the left-hand side of switch actuator 84 is momentarily moved downward, a control signal would be sent through line 68 to produce a turning movement of the rear wheels towards the left while movement of the other end of switch actuator 84 will produce a turning movement to the right.

Figure 2:
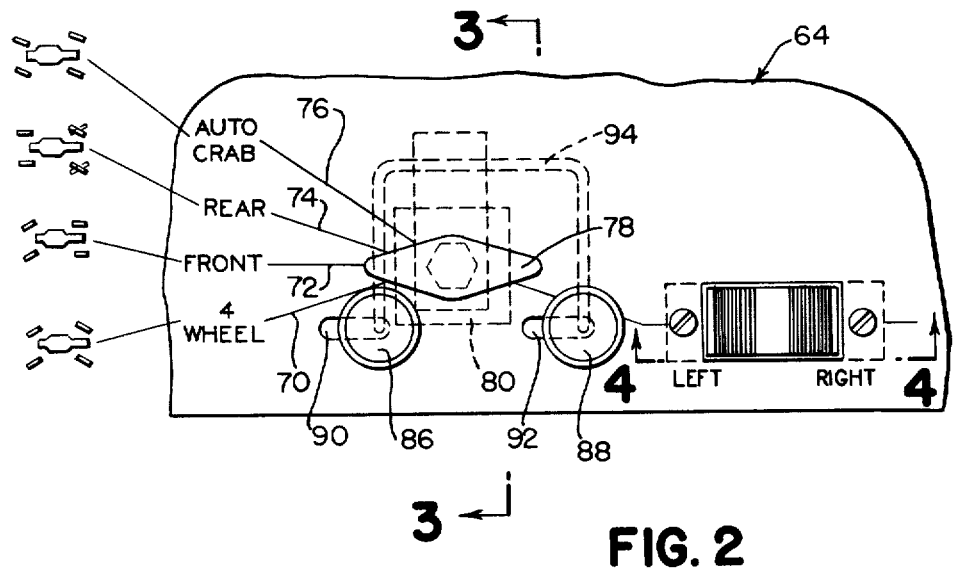
FIG. 2 is a fragmentary top plan view of the operator's control console for the steering system.
Figure 3:
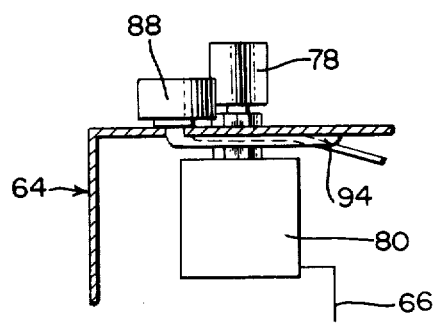
FIG. 3 is a sectional view taken along line 3-3 in FIG. 2.

As illustrated in FIGS. 2-3, control console 64 has a pair of knobs 86 and 88 slidably supported in elongated slots 90 and 92. Each knob 86, 88 is slidable between extreme positions in the respective slots 90 and 92 so that a knob can be located in the path of rotational movement of one end of selector means 78 in one position while allowing that end to move beyond the knob when the knob is moved to an opposite extreme position within a slot. The knobs 86 and 88 are interconnected to move as a unit between extreme ends of the slots by a generally U-shaped rod 94.

As described, the selection of the mode of steering is accomplished through a movable selector means 78 that moves the switch means 80 through a plurality of positions corresponding to the various modes of operation, one of which is automatic crab steering. In this mode of operation, the moveable selector means 78 is in position 76 that permits a control signal from the implement draft arms 96 to be integrated into the conventional steering system control means 50 for operating or turning the drive wheels 16 to a crab position thereby counteracting implement side draft.

The present invention provides a simple and efficient control mechanism for actuating control valve 42 thereby operating hydraulic motors 38 which turn the tractor driving wheels 16 in response to implement side draft. An implement (not shown) is conventionally attached to the free ends of the tractor draft arms 96 and produces a draft load upon the arms which is determined by the type of implement as well as the depth of the implement in the ground. Sensing means 98 are provided for detecting any changes in side draft force applied by the implement to the draft arms 96. In the illustrated embodiment, the draft sensing means 98 are in the form of conventional variable inductance transducers or load cells.

A variance in the signal through the draft arm load cells 98 in response to implement side draft is transmitted by wires 100, 102 to the control means 50 for the steering system to cause actuation of control valve 42 and operation of the hydraulic motors 38 to turn the tractor drive wheels 16 to a crab position.

A sensitivity control or variable resistance 104 is provided between the load cells 98 and steering system control means 50 to prevent unnecessary and undesirable movement of the drive wheels until the current imbalance in the load cells reaches a predetermined level.

The steering system is normally placed in the automatic crab steering mode of operation when the tractor and attached implement are working on a hillside. In this environment, it is desirable that the drive wheels be turned up slope immediately when any implement side draft or jackknifing occurs to reduce the possibility of the tractor sliding down a hill. In order to avoid time consuming, conventional, manual procedures for setting crab steering, the operator positions the movable selector means 78 to the automatic crab steering setting 76. Then, the control signal from the draft arm load cells 98 through wires 100, 102 is transmitted to the control means 50 for the steering circuit. An unequal side load applied to the draft arms 96 creates an unbalanced current flow from the load cells to the sensitivity control 104 and to the steering system control means 50. If the load imbalance is sufficient to overcome the sensitivity control setting, the steering system control means 50 actuates the control valve 42 that operates hydraulic motors 38 associated with drive wheels 16 to turn the drive wheels to an appropriate crab position depending upon the direction of load imbalance. The crab steering compensation will continue until the draft load on the draft arms 96 becomes equal within the sensitivity control setting. The automatic crab steering position 76 may be switched off at any time which permits the drive wheels to be controlled in a conventional manner.

It will be apparent to those skilled in the art that the foregoing disclosure is exemplary in nature rather than limiting, the invention being limited only by the appended claims.

I claim:

1. A steering system for a tractor including a frame having a pair of front drive wheels and a pair of rear drive wheels;
   steering means for controlling turning movements of said drive wheels;
   implement draft arms mounted to said frame for connecting an implement to said tractor;
   sensing means mounted to said implement draft arms for detecting side draft forces applied to said implement arms by an implement and producing an output signal in response to said side draft forces; and
   control means including switch means having a plurality of positions respectively defining different modes of steering and one mode of steering being selectable wherein said drive wheels are automatically turned at equal angles in the same direction so that the longitudinal axis of the tractor moves in a generally sidewise direction, and said control means receiving said output signal and actuating said steering means when said one mode of steering is selected and in response to side draft on said implement draft arms above a predetermined level.

2. The steering system as defined in claim 1, wherein said steering means includes a control valve for operating hydraulic motors which turn said rear drive wheels.

3. The steering system as defined in claim 2, wherein said sensing means comprise a load cell mounted to each implement draft arm, a variance in the output signal from said load cells in response to implement side draft being transmitted to said control means for actuating said control valve and operating said hydraulic motors to turn said rear drive wheels.

4. The steering system as defined in claim 3, including sensitivity control means connected between said load cells and said control means to prevent actuation of said control means by said output signal until said output signal reaches said predetermined level.

* * * * *